United States Patent
Wang et al.

(10) Patent No.: US 9,394,487 B2
(45) Date of Patent: Jul. 19, 2016

(54) MULTI-STAGE BIOMASS CONVERSION

(75) Inventors: Neil Wang, Baytown, TX (US); Liang Chen, Houston, TX (US); Peter Loezos, Sugarland, TX (US)

(73) Assignee: Inaeris Technologies, LLC, Pasadena, TX (US)

( * ) Notice: Subject to any disclaimer, the term of this patent is extended or adjusted under 35 U.S.C. 154(b) by 0 days.

(21) Appl. No.: 13/807,208

(22) PCT Filed: Jul. 22, 2011

(86) PCT No.: PCT/US2011/044955
§ 371 (c)(1),
(2), (4) Date: Mar. 28, 2013

(87) PCT Pub. No.: WO2012/012684
PCT Pub. Date: Jan. 26, 2012

(65) Prior Publication Data
US 2013/0205651 A1     Aug. 15, 2013

Related U.S. Application Data

(60) Provisional application No. 61/367,179, filed on Jul. 23, 2010.

(51) Int. Cl.
*C10G 11/00* (2006.01)
*C10B 53/02* (2006.01)
*C10B 49/22* (2006.01)
(Continued)

(52) U.S. Cl.
CPC ............... *C10G 11/00* (2013.01); *C10B 49/22* (2013.01); *C10B 53/02* (2013.01); *C10C 5/00* (2013.01); *C10G 1/02* (2013.01); *C10G 11/18* (2013.01); *C10L 1/02* (2013.01); *C10G 2300/1011* (2013.01); *C10G 2300/202* (2013.01); *Y02E 50/14* (2013.01); *Y02P 30/20* (2015.11)

(58) Field of Classification Search
USPC .......... 585/242, 240, 638, 648, 310; 422/144, 422/147, 187, 145, 606, 610, 623; 502/38; 48/76; 568/697, 897
See application file for complete search history.

(56) References Cited

U.S. PATENT DOCUMENTS

| 5,504,259 A | 4/1996 | Diebold et al. |
| 5,961,786 A | 10/1999 | Freel et al. |

(Continued)

FOREIGN PATENT DOCUMENTS

| EP | 1892280 | 2/2008 |
| WO | 2010/068748 | 6/2010 |

OTHER PUBLICATIONS

International Search Report for PCT Patent Application No. PCT/US2011/044955, filed on Jul. 22, 2011 dated Dec. 9, 2011, 2 pages.
(Continued)

*Primary Examiner* — Ellen McAvoy
*Assistant Examiner* — Chantel Graham
(74) *Attorney, Agent, or Firm* — Hovey Williams LLP

(57) ABSTRACT

A multi-stage process and system for converting solid particulate biomass in a riser reactor having at least two different reaction zones. A lower reaction zone is configured to optimize pyrolysis of the biomass into pyrolysis products, while an upper reaction zone is configured to efficiently crack the pyrolysis products. The relative residence times and/or temperatures of the upper and lower reaction zones can be controlled to optimize product quality and yield.

19 Claims, 3 Drawing Sheets

(51) Int. Cl.
*C10C 5/00* (2006.01)
*C10G 1/02* (2006.01)
*C10G 11/18* (2006.01)
*C10L 1/02* (2006.01)

(56) References Cited

U.S. PATENT DOCUMENTS

| | | |
|---|---|---|
| 2007/0213573 A1 | 9/2007 | Ross et al. |
| 2010/0162625 A1 | 7/2010 | Mills |
| 2010/0178217 A1 | 7/2010 | Alyaser |
| 2013/0023706 A1* | 1/2013 | Huber et al. ............. 585/241 |

OTHER PUBLICATIONS

European Search Report dated Jul. 2, 2014 for related European Patent Application No. EP 11810438.9, 7 pages.

Chinese Office Action dated May 12, 2014 for related Chinese Application No. 201180035451.3, 9 pages.

* cited by examiner

MULTI-STAGE BIOMASS CONVERSION

RELATED APPLICATIONS

This application is a national stage application, under 35 U.S.C. §371 of International Patent Application No. PCT/US2011/044955, filed on Jul. 22, 2011 and published as WO 2012/012684 on Jan. 26, 2012, which claims the priority benefit of U.S. Provisional Application No. 61/367,179, filed on Jul. 23, 2010, both of which are hereby incorporated by reference in their entirety.

BACKGROUND

1. Field of the Invention

This invention relates generally to the conversion of biomass into useful intermediates and/or end products. More particularly, the invention relates to processes and apparatuses for converting solid particulate biomass into gaseous and liquid products that may be utilized for transportation fuels, petrochemicals, and/or specialty chemicals.

2. Description of the Related Art

With its low cost and wide availability, biomass is an ideal feedstock to produce "green" liquid fuels. By utilizing biomass as a feedstock, our dependence on fossil fuels for energy needs may be reduced.

In an attempt to harness the energy potential of biomass, many processes have been developed that convert biomass into fuels and/or specialty chemicals. Examples of conventional biomass conversion processes include combustion, gasification, slow pyrolysis, liquefaction, and enzymatic conversion. Despite their potential to convert biomass, many of the aforementioned processes have exhibited drawbacks. For example, combustion is restricted to immediate thermal applications and does not produce any useful products. Gasification requires a large amount of energy to provide the necessary high temperatures (800-1,300° C.) needed to produce syngas, a low energy fuel gas with limited uses. Both slow pyrolysis and liquefaction require long residence times in their reactors and produce low quality yields of the desired liquid or gaseous products. Furthermore, the liquid products of slow pyrolysis and liquefaction often require considerable secondary upgrading before being used as a biofuel. Finally, enzymatic conversion takes considerable time, requires expensive equipment, and its products require extensive upgrading in order to be commercially viable.

Fast pyrolysis is generally recognized as offering the most promising route to the conversion of solid biomass materials into biofuels and/or specialty chemicals. Fast pyrolysis relies on a fast heating rate of the biomass feedstock, a short residence time in the reactor, and rapid cooling from the reaction zone. Consequently, a larger yield of the desirable liquid product is produced, while the yield of undesirable reaction products, such as char, coke, and ash, is reduced. The liquid product produced by pyrolysis is commonly referred to as "pyrolysis oil;" however, when derived from biomass it is generally called "bio-oil." Bio-oil has many useful end-use applications, such as in transportation fuels, petrochemicals, specialty chemicals and/or as food additives (liquid smoke).

Despite its recognition as an advantageous process to produce bio-oil from biomass, much research is still being undertaken to determine which reactor configuration may best facilitate the fast pyrolysis reaction. Lately, the focus has been on ablative reactors, cyclone reactors, and fluidized reactors to provide the fast heating rates needed for fast pyrolysis. Fluidized bed reactors, including riser reactors and fluidized stationary bed reactors, have been the basis of much research due to their ubiquitous availability in existing infrastructure based on their use in petroleum refineries.

Previous fast pyrolysis processes utilizing a riser reactor have produced lower quality bio-oils. For example, U.S. Pat. No. 5,961,786 discloses a process for converting wood particles to a liquid smoke flavoring product (bio-oil). The process uses a transport reactor, with the heat being supplied by hot heat transfer particles, such as sand, sand/catalyst mixtures, or silica-alumina catalysts. Although this process produces a relatively high bio-oil yield in the range of 50 to 65%, the produced bio-oil had properties that were desirable for "liquid smoke" food flavorings (low pH, high oxygen content, and browning propensity), but that are undesirable for liquid fuels.

In light of the foregoing, there exists a need for an efficient and economical biomass conversion process that provides high yields of high quality liquid fuels, such as bio-oil.

SUMMARY

In one embodiment of the present invention, a biomass conversion process is provided that includes the steps of (a) pyrolyzing solid particulate biomass in a lower reaction zone of a riser reactor to produce an initial pyrolysis product; (b) combining a thermal modification medium with the initial pyrolysis product to form a thermally-modified product mixture, where the thermal modification medium has a substantially different temperature than the temperature of the initial pyrolysis product; and (c) cracking at least a portion of the thermally-modified product mixture in an upper reaction zone of the riser reactor to produce a cracked pyrolysis product. To facilitate the process, the vapor component residence time in the upper reaction zone is at least 50 percent greater than the vapor component residence time in the lower reaction zone.

In another embodiment of the invention, a biomass conversion process is provided that includes the steps of (a) pyrolyzing solid particulate biomass in a lower reaction zone of a riser reactor to convert at least 50 weight percent of the solid particulate biomass into vapor components of an initial pyrolysis product, where the lower reaction zone is maintained at an average pyrolysis temperature in the range of 250 to 750° C. during pyrolysis; (b) combining a quenching medium with the initial pyrolysis product to form a quenched product mixture, where the temperature of the quenching medium is at least 20° C. less than the temperature of the initial pyrolysis product; and (c) catalytically cracking at least a portion of the quenched product mixture in an upper reaction zone of the riser reactor to produce a cracked pyrolysis product. The upper reaction zone is maintained at an average cracking temperature that is at least 10° C. less than the average pyrolysis temperature. Further, the average horizontal cross-sectional area of the upper reaction zone is at least 50 percent greater than the average horizontal cross-sectional area of the lower reaction zone.

In yet another embodiment of the invention, an apparatus for converting solid particulate biomass to bio-oil is provided. The apparatus comprises a riser reactor and a temperature control system. The riser reactor defines a lower reaction zone and an upper reaction zone. The temperature control system is configured to introduce a thermal modification medium into the riser reactor at a location proximate to the juncture of the upper and lower reaction zones. The average horizontal cross-sectional area of the upper reaction zone is at least 50 percent greater than the average horizontal cross-sectional area of the lower reaction zone.

BRIEF DESCRIPTION OF THE FIGURES

Embodiments of the present invention are described herein with reference to the following drawing figures, wherein.

DETAILED DESCRIPTION

Figure 1:
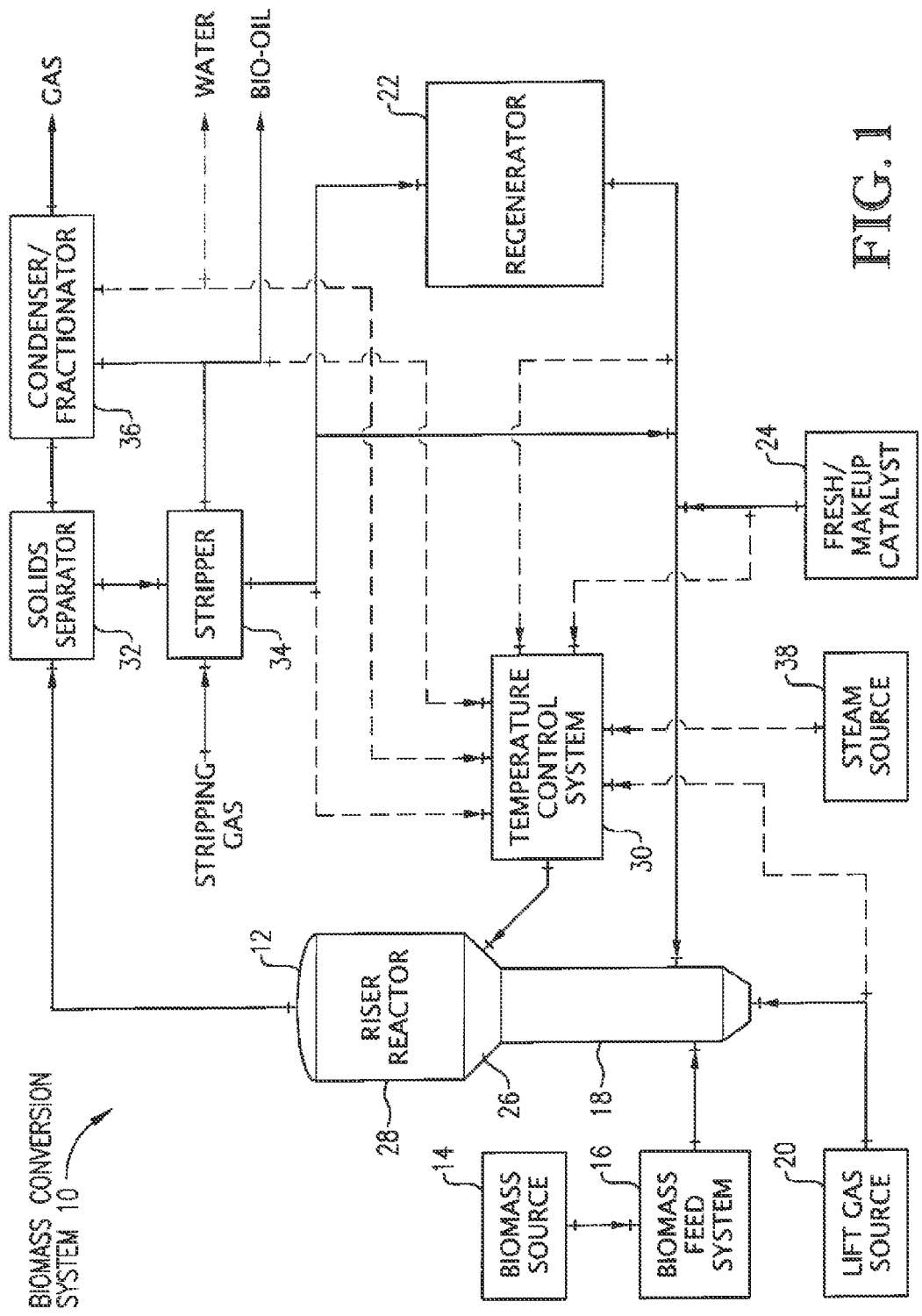
FIG. 1 is a diagram of an exemplary biomass conversion system that employs a multi-stage riser reactor configured in accordance with one embodiment of the present invention.

FIG. 1 depicts an exemplary biomass conversion system 10 that employs a multi-stage riser reactor 12 for facilitating the thermochemical conversion of biomass. It should be understood that the biomass conversion system 10 shown in FIG. 1 is just one example of a system within which the present invention can be embodied. Many other configurations of biomass conversion systems can be used in conjunction with the present invention. The particular biomass conversion system 10 illustrated in FIG. 1 will now be described in detail.

The biomass conversion system 10 of FIG. 1 includes a biomass source 14 for supplying biomass to a biomass feed system 16. The biomass source 14 can be, for example, a hopper, storage bin, railcar, over-the-road trailer, or any other object that may hold or store biomass. In one embodiment, the biomass material provided to the biomass feed system 16 is in the form of solid particulate biomass having a mean particle diameter of 50 μm to 2 mm, 100 μm to 1 mm, or 100 μm to 700 μm.

The composition of the biomass material provided by the biomass source 14 can vary greatly. In one embodiment, the biomass material comprises cellulose. Examples of suitable cellulose-containing materials include algae, paper waste, and/or cotton linters. In another embodiment, the biomass material comprises lignocellulose. Examples of suitable lignocellulosic materials include forestry waste, such as wood chips, saw dust, pulping waste, and tree branches; agricultural waste such as corn stover, wheat straw, and bagasse; and/or energy crops such as eucalyptus, switch grass, and coppice.

While in the biomass feed system 16, the biomass material may undergo a number of pretreatments to facilitate the subsequent conversion reactions. Such pretreatments may include drying, roasting, torrefaction, demineralization, steam explosion, mechanical agitation, and/or any combination thereof.

The biomass feed system 16 introduces the biomass material into a lower reaction zone 18 of the riser reactor 12. In the lower reaction zone 18 of the riser reactor 12, the biomass material is combined with upwardly flowing gas from a lift gas source 20 and with solid particles (e.g., catalyst) from a regenerator 22. The solid biomass particles and regenerated particles introduced into the lower reaction zone 18 are entrained by the lift gas and rise upwardly through the lower reaction zone 18.

The lift gas introduced into the lower reaction zone 18 can be any of a variety of substantially oxygen-free gases. Exemplary lift gases include inert gases (e.g., nitrogen, steam, or $CO_2$), reducing gas (e.g., hydrogen or CO), and hydrogen-donors (e.g., lower alkanes). As discussed in further detail below, the solid particles from regenerator 22 can include particles of a cracking catalyst and/or particles of an inorganic heat carrier.

The lower reaction zone 18 is configured to facilitate short residence times and rapid heating necessary for efficient pyrolysis of the biomass. While in the lower reaction zone 18, at least a portion of the solid particulate biomass is subjected to pyrolysis to form an initial pyrolysis product comprising gas, vapor, and solid reaction products. The gaseous products may include carbon dioxide, carbon monoxide, and relatively minor amounts of hydrogen, methane, and ethylene. The solid reaction products may include coke, char, and residual biomass. The vapor components are reaction products that can eventually be condensed into a liquid fuel (e.g., bio-oil) in subsequent stages of the process.

The pyrolysis reaction carried out in the lower reaction zone 18 of the riser reactor 12 may consist of either thermal pyrolysis or catalytic pyrolysis. As used herein, "pyrolysis" refers to the chemical conversion of biomass caused by heating the feedstock in an atmosphere that is substantially free of oxygen. In one embodiment, pyrolysis is carried out in the presence of an inert gas, such as nitrogen. Alternatively, the pyrolysis can be carried out in the presence of a reducing gas, such as hydrogen, carbon monoxide, steam, or any combination thereof.

When a catalyst is introduced into the lower reaction zone 18 of the riser reactor 12, such catalyst may be either fresh catalyst from a fresh/makeup catalyst source 24 and/or regenerated catalyst from the regenerator 22. In an alternative embodiment, a catalyst may be physically mixed with and/or impregnated into the solid particulate biomass prior to introduction into the lower reaction zone 18.

The catalyst employed in the riser reactor 12 can comprise a solid acid, such as a zeolite. Examples of suitable zeolites include ZSM-5 and zeolite-Y. Additionally, the catalyst may comprise a super acid. Examples of suitable super acids include sulfonated, phosphated, or fluorinated forms of zirconia, titania, alumina, silica-alumina, and/or clays. In another embodiment, the catalyst can comprise a solid base. Examples of suitable solid bases include metal oxides, metal hydroxides, and metal carbonates. In particular, the oxides, hydroxides, and carbonates of alkali metals, alkaline earth metals, transition metals, and/or rare earth metals are suitable. Other suitable solid bases are layered double hydroxides, mixed metal oxides, hydrotalcites, hydrotalcite-like materials, clays, and/or combinations thereof. As used herein, the term "hydrotalcite-like materials" refers to materials having the structure of hydrotalcite, but wherein the divalent metal is not Mg and/or the trivalent metal is not Al. In yet another embodiment, the catalyst can also comprise an alumina, such as alpha-alumina.

It has been found that catalysts for use in this process preferably have a low to moderate catalytic activity, as too high a catalytic activity easily leads to excess cracking of the pyrolysis product. Accordingly, catalysts comprising calcined materials are desirable. In particular, catalyst materials that have been calcined at temperatures above 500° C., or even above 1,000° C. may be most desirable. Suitable examples of calcined materials include clay materials that have been calcined, preferably through the isotherm. Kaolin is an example of a suitable clay. The clay material may comprise oxides, hydroxides, carbonates, or hydroxyl carbonates derived from alkaline earth metals, transition metals, and/or rare earth metals.

It should be noted that solid biomass materials generally contain minerals. It is recognized that some of these minerals, such as potassium carbonate, can have catalytic activity in the pyrolysis of the biomass material. Even though these minerals are typically present during the chemical conversion taking place in the lower reaction zone 18, they are not considered catalysts.

The temperature of the lower reaction zone 18 is optimized to facilitate pyrolysis of the biomass feedstock. The average pyrolysis temperature in the lower reaction zone 18 is maintained in the range of 200 to 1,000° C., in the range of 250 to 750° C., or in the range of 300 to 600° C.

In one embodiment, the pyrolysis reaction carried out in the lower reaction zone 18 converts at least about 25 weight percent of the solid particulate biomass into vapor components of the initial pyrolysis product. In another embodiment, the pyrolysis reaction converts at least about 50 weight percent of the solid particulate biomass into vapor components. In still another embodiment, the pyrolysis reaction converts at least about 75 weight percent of the solid particulate biomass into vapor components.

As mentioned above, it is desirable for the residence time in the lower reaction zone 18 to be relatively short. Accordingly, the residence time of the vapor components (i.e., the "vapor component residence time") in the lower reaction zone 18 is in the range of 0.1 to 5 seconds or 0.5 to 3 seconds.

Following pyrolysis of the biomass in the lower reaction zone 18, the resulting initial pyrolysis product can be immediately carried upwardly through a transition zone 26 and into an upper reaction zone 28 of the riser reactor 12. As depicted in FIG. 1, a thermal modification medium from a temperature control system 30 can be introduced into the riser reactor 12 at or near the transition zone 26. A thermally-modified product mixture is formed upon combining the initial pyrolysis product with the thermal modification medium.

The thermal modification medium has a substantially different temperature than the initial pyrolysis product with which it is combined. For example, the thermal modification medium may have a temperature that is at least 20° C. different, at least 50° C. different, or at least 100° C. different than the temperature of the initial pyrolysis product with which it is combined. In one embodiment the temperature of the thermal modification medium is lower than that of the initial pyrolysis product, so as to quench/lower the temperature of the initial pyrolysis product prior to entering the upper reaction zone 28. In such an embodiment, the thermal modification may be referred to as a "quenching medium." In another embodiment, the temperature of the thermal modification medium is higher than that of the initial pyrolysis product, so as to raise the temperature of the initial pyrolysis product prior to entering the upper reaction zone 28.

As depicted in FIG. 1, a variety of sources can be used, alone or in combination, to provide the thermal modification medium to the temperature control system 30. Accordingly, the thermal modification medium may be comprised of liquid pyrolysis products, gaseous pyrolysis products, particles of a cracking catalyst, steam, lift gas, particles of an inorganic solid, and/or any combination thereof. In one embodiment, the cooled and condensed liquid pyrolysis products, which can include water and/or condensed bio-oil, can be used as the thermal modification medium.

As mentioned above, after combining the thermal modification medium with the initial pyrolysis products, the resulting thermally-modified product mixture is introduced into the upper reaction zone 28 of the riser reactor 12. In the upper reaction zone 28, at least a portion of the thermally-modified product mixture is subject to cracking (e.g., catalytic cracking) to produce a cracked pyrolysis product.

The upper reaction zone 28 can be maintained at an average cracking temperature that is at least 10° C. different, at least 50° C. different, or at least 75° C. different from the average pyrolysis temperature in the lower reaction zone 18. In one embodiment, the average cracking temperature in the upper reaction zone 28 is less than the average pyrolysis temperature in the lower reaction zone 18. In another embodiment, the average cracking temperature in the upper reaction zone 28 is greater than the average pyrolysis temperature in the lower reaction zone 18.

To facilitate cracking of the initial pyrolysis product, the upper reaction zone 28 can have an average horizontal cross-sectional area that is greater than the average horizontal cross-sectional area of the lower reaction zone 18. In particular, the average horizontal cross-sectional area of the upper reaction zone 28 can be at least 50 percent, at least 150 percent, or at least 400 percent greater than the average horizontal cross-sectional area of the lower reaction zone 18.

The greater average horizontal cross-sectional area of the upper reaction zone 28 can allow for longer residence times, which may be beneficial for optimizing cracking of the initial pyrolysis product. For example, the vapor component residence time in the upper reaction zone 28 can be at least 50 percent, at least 150 percent, or at least 400 percent greater than the vapor component residence time in the lower reaction zone 18. The vapor component residence time in the upper reaction zone 28 can be 1 to 20 seconds or 2 to 10 seconds.

The cracking reaction carried out in the upper reaction zone 28 converts non-volatile vapor components (i.e., heavy components) present in the initial pyrolysis product into volatile vapor components (i.e., lighter components). As used herein, "volatile components" are components that vaporize at temperatures less than 200° C. at 172 pascals, whereas "non-volatile components" vaporize at temperatures greater than or equal to 200° C. at 172 pascals. In embodiments of the present invention, the cracking reaction carried out in the upper reaction zone 28 can convert at least 10 weight percent, at least 25 weight percent, or at least 50 weight percent of the non-volatile vapor components into volatile vapor components.

The cracking reaction carried out in the upper reaction zone 28 can cause the cracked pyrolysis product exiting the upper reaction zone 28 to have increased aromaticity, compared to the initial pyrolysis product introduced into the upper reaction zone 28. For example, the concentration, by weight, of aromatic hydrocarbons in the cracked pyrolysis product exiting the upper reaction zone 28 can be at least 10 percent, at least 25 percent, or at least 50 percent greater than the concentration of aromatic hydrocarbons in the initial pyrolysis product. In addition, the reactions carried out in the upper reaction zone 28 can cause the cracked pyrolysis product exiting the upper reaction zone 28 to have an increased oxygen-free hydrocarbon content, compared to the initial pyrolysis product introduced into the upper reaction zone 28. These additional hydrocarbons produced in the upper reaction zone 28 can be generated by further cracking and/or deoxygenating components of the initial pyrolysis product. Thus, the concentration, by weight, of oxygen-free hydrocarbons in the cracked pyrolysis product exiting the upper reaction zone 28 can be at least 10 percent, at least 25 percent, or at least 50 percent greater than the concentration of oxygen-free hydrocarbons in the initial pyrolysis product. Furthermore, the cracking reaction carried out in the upper reaction zone 28 can cause an increase in the cumulative amount of carbon monoxide, carbon dioxide, and water in the pyrolysis products. Thus, the cumulative concentration, by weight, of carbon monoxide, carbon dioxide, and water in the cracked pyrolysis product exiting the upper reaction zone 28 can be at least 10 percent, at least 25 percent, or at least 50 percent greater than the cumulative concentration of carbon monoxide, carbon dioxide, and water in the initial pyrolysis product.

The cracked pyrolysis product and lift gas are discharged from the riser reactor 12 via an outlet at the top of the upper reaction zone 28. The cracked pyrolysis product is then conveyed into a solids separator 32 for the removal of solids such as deactivated catalyst particles, inorganic components from the biomass, inorganic contaminants, unconverted biomass, char, and/or coke. The solids separator 32 can be any device known in the art for removing solids from a vapor/gas. One example of a suitable solids separator 32 is a cyclone separator.

The solids removed in solids separator 32 can be sent to a stripper 34 to remove volatile materials therefrom. Subsequently, the stripped solids may be routed to the temperature control system 30, the lower reaction zone 18 of the riser reactor 12, and/or the regenerator 22.

In the regenerator 22, coke and unconverted biomass are combusted and the deactivated catalyst particles are regenerated. The hot regenerated catalyst and any other components exiting the regenerator 22 can be routed to the temperature control system 30 and/or to the lower reaction zone 18 of the riser reactor 12. As depicted in FIG. 1, the regenerated catalysts may be supplemented with fresh cracking catalysts from a fresh/makeup catalyst source 24 prior to being introduced into the lower reaction zone 18.

The gas and vapor components exiting the solids separator 32 can be routed to a condenser 36, to condense out the bio-oil. In one embodiment, the condenser 36 also functions as a fractionator to remove excess water from the bio-oil. As depicted in FIG. 1, a portion of the bio-oil and/or water recovered from the condenser 36 can be routed to the temperature control system 30 for use as all or part of the thermal modification medium.

The temperature control system 30 can receive solids, liquids, and/or vapors from a variety of sources. For example, as shown in FIG. 1, the temperature control system 30 can be coupled in fluid-flow communication with one or more of the following items: the solids outlet of the stripper 34, the bio-oil outlet of the condenser/fractionator 36, the water outlet of the condenser/fractionator 36, the outlet of the regenerator 22, the fresh/makeup catalyst source 24, a steam source 38, and/or the lift gas source 20.

The temperature control system 30 can take a variety of forms. For example, the temperature control system 30 may simply be a conduit, pump, or conveyor for receiving a medium from one or more sources and then supplying the thermal modification medium to the riser reactor 12. Alternatively, the temperature control system 30 can employ a combination of known types of equipment for combining, heating, and/or cooling different streams. Regardless of the specific configuration of the temperature control system 30, its primary function is to control the temperature, composition, and/or feed rate of the thermal modification medium introduced into the riser reactor 12. By controlling these parameters of the thermal modification medium, the temperature control system 30 increases or decreases the temperature of the upper reaction zone 28 relative to the lower reaction zone 18 so as to provide for optimum reaction conditions.

Figure 2:
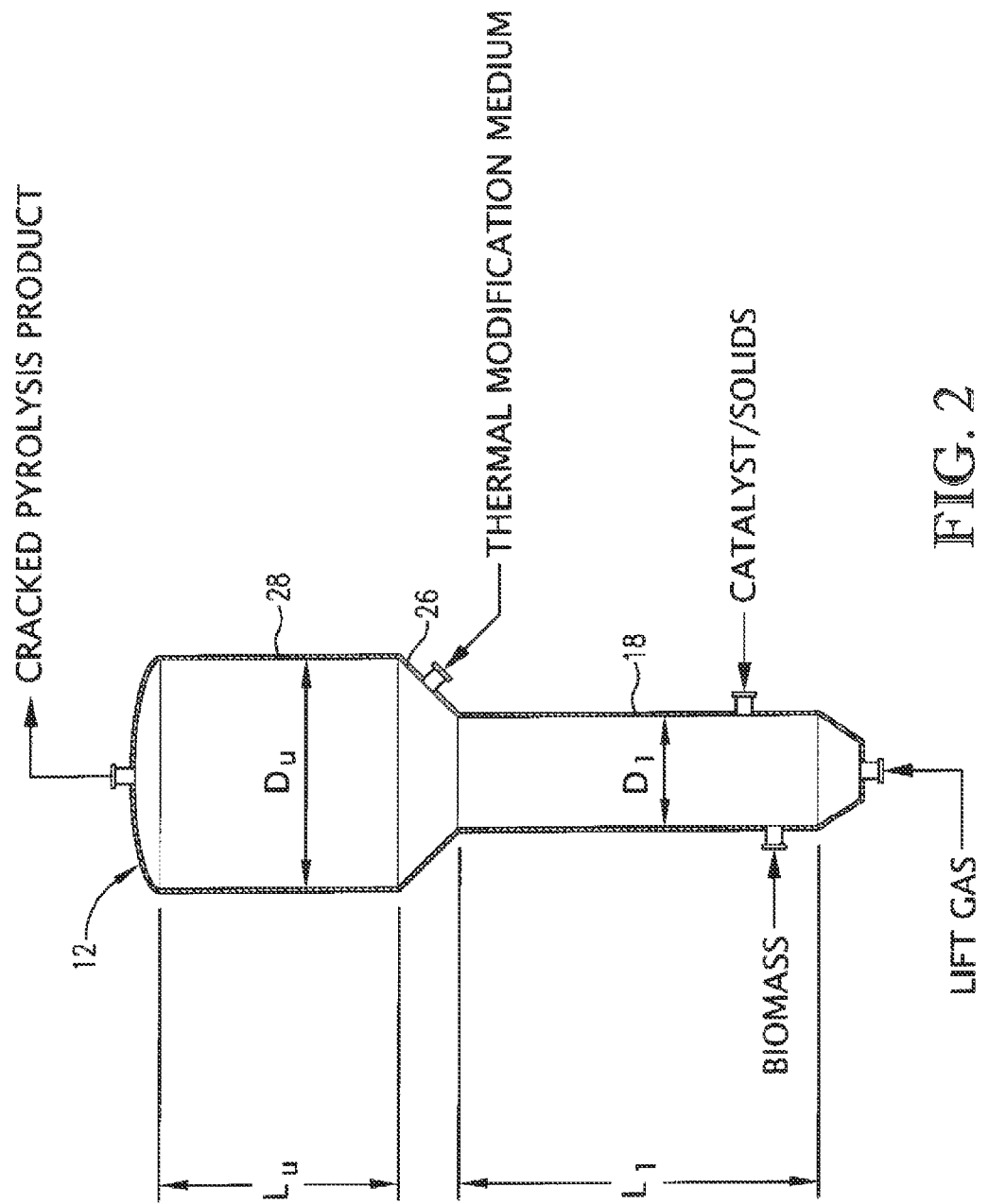
FIG. 2 illustrates a multi-stage riser reactor configured in accordance with one embodiment of the present invention.

FIG. 2 provides a more detailed view of a riser reactor 12 suitable for use in conjunction with the present invention. It should be understood that the riser reactor 12 depicted in FIG. 2 is included merely for the purposes of illustration and is not intended to limit the scope of the invention unless otherwise specifically indicated. FIG. 2 shows a two-stage riser reactor 12, with a lower reaction zone 18, an upper reaction zone 28, and a transition zone 26 between the lower and upper reaction zones 18,28. Biomass, lift gas, and cracking catalyst are injected through different inlets into the lower reaction zone 18.

FIG. 2 shows the dimensions of the lower and upper reaction zones 18, 28. In one embodiment, the diameter ($D_u$) of the upper reaction zone 28 is substantially greater than the diameter ($D_l$) of the lower reaction zone 18 so as to provide for optimum pyrolysis conditions in the lower reaction zone 18 and optimum cracking conditions in the upper reaction zone 28. In addition, the lengths ($L_l, L_u$) of the lower and upper reaction zones 18, 28 are optimized to enhance both the pyrolysis and cracking reactions. The lower reaction zone 18 can have a length-to-diameter ($L_l/D_l$) ratio in the range of 2 to 20 or 4 to 10, while the upper reaction zone 28 can have a ($L_u/D_u$) ratio in the range of 2 to 20 or 4 to 10.

As discussed previously, the initial pyrolysis product from the lower reaction zone 18 passes through the transition zone 26 prior to entering the upper reaction zone 28. The horizontal cross-sectional area of the transition zone 26 increases upwardly towards to the upper reaction zone 28 so as to account for the increased diameter of the upper reaction zone 28 over the lower reaction zone 18.

In the embodiment depicted in FIG. 2, the thermal modification medium is introduced into the transition zone 26 of the riser reactor 12. In other embodiments, the thermal modification medium could be introduced anywhere in the top one-third of the lower reaction zone 18, in the transition zone 26, and/or in the bottom one-third of the upper reaction zone 28.

EXAMPLE

Figure 3:
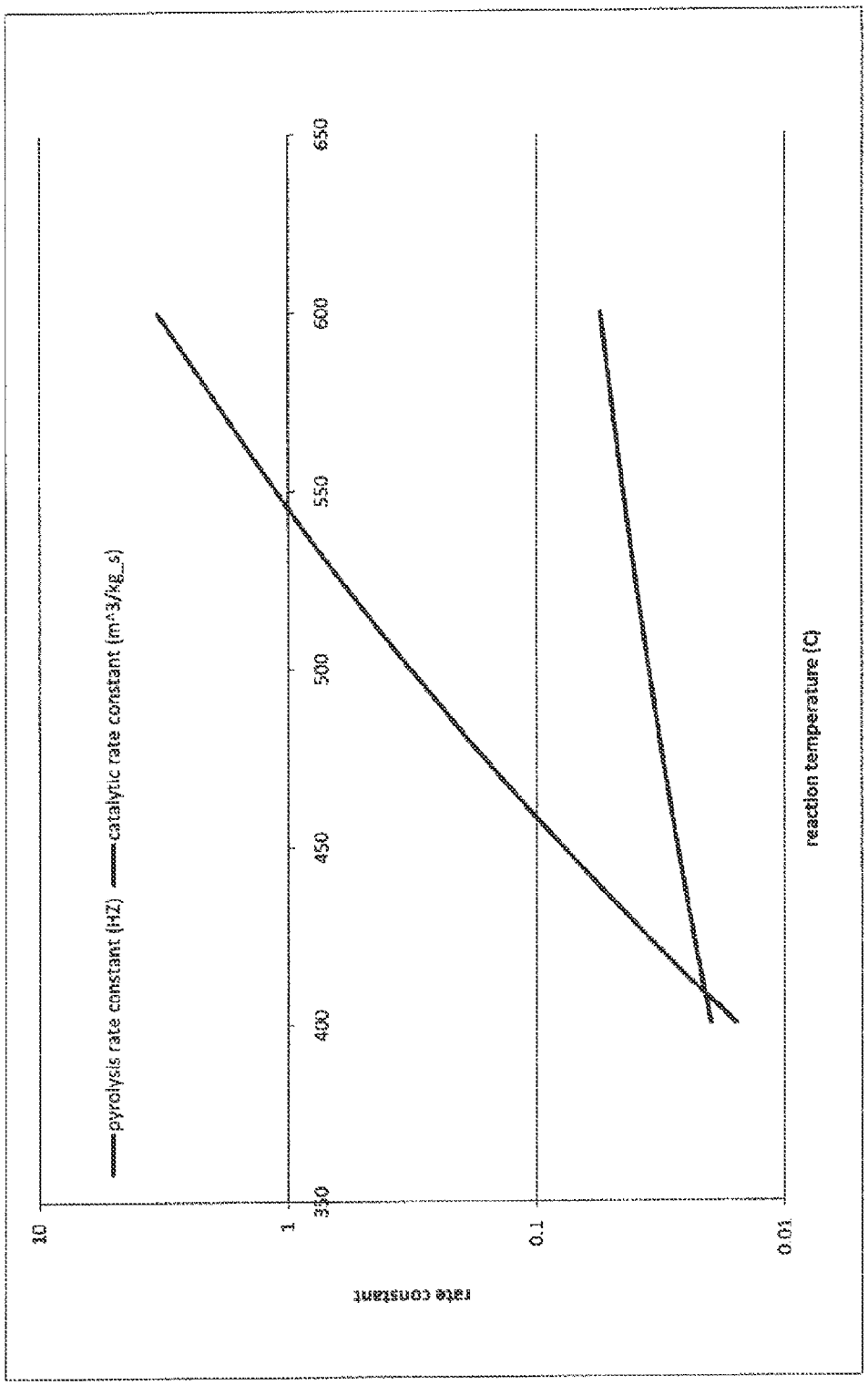
FIG. 3 illustrates plots of thermal pyrolysis and catalytic rate constants as a function of reaction temperature relating to biomass conversion.

FIG. 3 plots thermal pyrolysis and catalytic rate constants, as a function of reaction temperature, relating to biomass conversion. The pyrolysis rate constant is expressed in units of $sec^{-1}$ (Hertz, "HZ" in the Figure), and the catalytic rate constant is in $m^3/kg \cdot sec$. The FIG. 3 demonstrates the greater temperature sensitivity of the pyrolysis rate constant in comparison to the catalytic rate constant. The pyrolysis rate constants are based on typical data found in the open literature. The catalytic rate constants are based on measurements performed on bench scale units wherein southern yellow pine wood chips were converted to reaction products, including bio-oil. It is generally known in the field of biomass conversion that operation at relatively low reaction temperatures has a positive impact on overall oil yields. Due to the sensitivity of the pyrolysis reaction rate with temperature, operation at temperatures below 450 F may require reactor residence times that are practically infeasible. By performing biomass pyrolysis at a relatively higher temperature in a relatively low residence time zone, catalytic upgrading can be subsequently performed in the desired low temperature range in a relatively high residence time zone. Because the catalytic reaction rate constant is relatively less sensitive to reaction temperature, the entire pyrolysis and catalytic upgrading process can be performed in reactor geometries well within practical design constraints.

The preferred forms of the invention described above are to be used as illustration only, and should not be used in a limiting sense to interpret the scope of the present invention. Modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as it pertains to any apparatus not materially departing from but outside the literal scope of the invention as set forth in the following claims.

What is claimed is:

1. A biomass conversion process comprising:
   (a) pyrolyzing solid particulate biomass in a lower reaction zone of a riser reactor to thereby produce an initial pyrolysis product;
   (b) combining a thermal modification medium with said initial pyrolysis product to thereby form a thermally-modified product mixture, wherein said thermal modification medium has a substantially different temperature than the temperature of said initial pyrolysis product; and
   (c) cracking at least a portion of said thermally-modified product mixture in an upper reaction zone of said riser reactor to thereby produce a cracked pyrolysis product, wherein the vapor component residence time in said upper reaction zone is at least 50 percent greater than the vapor component residence time in said lower reaction zone.

2. The process of claim 1 wherein the vapor component residence time in said lower reaction zone is in the range of 0.1 to 5 seconds.

3. The process of claim 2 wherein the vapor component residence time in said upper reaction zone is at least 150 percent greater than the vapor component residence time in said lower reaction zone.

4. The process of claim 1 wherein the vapor component residence time in said lower reaction zone is in the range of 0.5 to 3 seconds, wherein the vapor component residence time in said upper reaction zone is at least 400 percent greater than the vapor component residence time in said lower reaction zone.

5. The process of claim 1 wherein the average horizontal cross-sectional area of said upper reaction zone is greater than the average horizontal cross-sectional area of said lower reaction zone.

6. The process of claim 1 wherein the average horizontal cross-sectional area of said upper reaction zone is at least 50 percent greater than the average horizontal cross-sectional area of said lower reaction zone.

7. The process of claim 1 wherein the temperature of said thermal modification medium is at least 20° C. different than the temperature of said initial pyrolysis product.

8. The process of claim 7 wherein the temperature of said thermal modification medium is less than the temperature of said initial pyrolysis product.

9. The process of claim 1 wherein said lower reaction zone is maintained at an average pyrolysis temperature and said upper reaction zone is maintained at an average cracking temperature, wherein said average pyrolysis temperature is in the range of 200 to 1,000° C. wherein said average cracking temperature is at least 10° C. less than said average pyrolysis temperature.

10. The process of claim 9 wherein said average pyrolysis temperature is in the range of 300 to 600° C., wherein said average cracking temperature is at least 50° C. less than said average pyrolysis temperature.

11. The process of claim 1 wherein said thermal modification medium comprises liquid pyrolysis products, gaseous pyrolysis products, particles of a cracking catalyst, steam, lift gas, and/or particles of an inorganic solid.

12. The process of claim 1 wherein said pyrolyzing of step (a) converts at least about 25 weight percent of said solid particulate biomass into vapor components of said initial pyrolysis product.

13. The process of claim 12 wherein said vapor components of said initial pyrolysis product comprises volatile components and non-volatile components, wherein said volatile components vaporize at temperatures less than 200° C. at 172 pascals and said non-volatile components vaporize at temperature greater than or equal to 200° C. at 172 pascals, wherein said cracking of step (c) converts at least 10 weight percent of said non-volatile components of said initial pyrolysis product into volatile components.

14. The process of claim 13 wherein said pyrolyzing of step (a) converts at least about 50 weight percent of said solid particulate biomass into said vapor components of said initial pyrolysis product, wherein said cracking of step (c) converts at least 25 weight percent of said non-volatile components of said initial pyrolysis product into volatile components.

15. A biomass conversion process comprising:
   (a) pyrolyzing solid particulate biomass in a lower reaction zone of a riser reactor to thereby convert at least 50 weight percent of said solid particulate biomass into vapor components of an initial pyrolysis product, wherein said lower reaction zone is maintained at an average pyrolysis temperature in the range of 250 to 750° C. during said pyrolyzing;
   (b) combining a quenching medium with said initial pyrolysis product to thereby form a quenched product mixture, wherein the temperature of said quenching medium is at least 20° C. less than the temperature of said initial pyrolysis product; and
   (c) catalytically cracking at least a portion of said quenched product mixture in an upper reaction zone of said riser reactor to thereby produce a cracked pyrolysis product, wherein said upper reaction zone is maintained at an average cracking temperature that is at least 10° C. less than said average pyrolysis temperature, wherein the average horizontal cross-sectional area of said upper reaction zone is at least 50 percent greater than the average horizontal cross-sectional area of said lower reaction zone.

16. The process of claim 15 wherein the average horizontal cross-sectional area of said upper reaction zone is at least 150 percent greater than the average horizontal cross-sectional area of said lower reaction zone.

17. The process of claim 15 wherein the vapor component residence time in said upper reaction zone is at least 50 percent greater than the vapor component residence time in said lower reaction zone.

18. The process of claim 15 wherein the vapor component residence time in said lower reaction zone is in the range of 0.5 to 3 seconds, wherein the vapor component residence time in said upper reaction zone is at least 400 percent greater than the vapor component residence time in said lower reaction zone.

19. The process of claim 15 wherein said quenching medium comprises liquid pyrolysis products, gaseous pyrolysis products, particles of a cracking catalyst, steam, lift gas, and/or particles of an inorganic solid.

* * * * *